Figure 1:
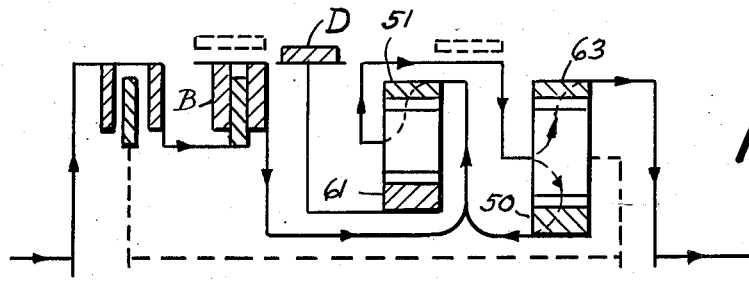

INVENTOR.
HOWARD W. SIMPSON.
BY

INVENTOR.
Howard W. Simpson

United States Patent Office 2,826,936
Patented Mar. 18, 1958

2,826,936

VARIABLE SPEED TRANSMISSION

Howard W. Simpson, Dearborn, Mich.

Application August 3, 1953, Serial No. 371,974

15 Claims. (Cl. 74—759)

This invention relates to a transmission for converting and transmitting power at four different gear ratios forwardly and one in reverse. It is a novel combination of a hydrodynamic device, planetary gearing, input and output shafts, reaction members, friction brakes for holding the reaction members, friction clutches for interconnecting the various members, support and housing members, hydraulic pistons and mechanism for operating the clutches and brakes, and pumps for producing hydraulic pressure.

Many speeds are obtained with few gears in this disclosure by multi-path transmission of power through two simple planetary gear sets. The two sets are connected together differentially in two different ways to obtain the two slowest speeds, but in the two fastest speeds and in reverse, torque passes through a single gear set in three different paths.

Specifically, in low and second speeds there are two input members, one for each planetary set.

In third speed the second set is locked up by engaging both clutches and in fourth speed the torque is demultiplied in the second set. In reverse the torque is multiplied and reversed in the second set.

To accomplish this, two friction clutches are used, either of which can connect the input torque to a member of each gear set simultaneously or to a member of only one set, depending on which reaction brake is applied, but all the members so connected are different for each clutch. It is this unique condition which makes it possible to obtain the four speeds forward and reverse with only two simple planetary gear sets. The ring gear of the second gear set is the output member in all speeds.

A feature of this disclosure is the overdrive, which constitutes the fourth speed. It is obtained through the same gears that are used for reverse and without the use of extra gearing. Automatic transmissions heretofore have not provided an overdrive without adding gearing to that needed to provide the customary three speeds and reverse. Consequently many users prefer old style manually controlled transmissions with a separate automatic overdrive unit added, in order to reduce engine noise and to obtain better fuel economy. My invention combines the overdrive with the main transmission in the same space as required for a three speed unit, thus providing an overdrive at low cost.

Another advantage of my arrangement is lessened danger of overheating in the two lowest speeds. It is in these speeds that the greatest heat is produced, due largely to the slippage loss in the hydrodynamic device. Any additional heat from the gear unit brings the transmission, as a whole, that much closer to failure, when subjected to extreme conditions, such as pulling a heavy load up a long grade. Whereas in most automatic transmissions, free running clutches have a clutch plate differential speed equal to that of input speed or higher, in the present instance the plate differential averages less than half of input speed in the first and second gear ratios. Thus the frictional drag loss and heat at the clutch which is disengaged in these two speeds is very low.

Another advantage is the smooth speed changes that occur under continuous power without irritating jerks. Although the brake bands are intended to be self energizing, all shifts are smooth because when the shifts are made, the brake bands are rotating in the non-energizing direction.

A further advantage is that no double shifts are required. In other words when each speed change is made, one friction element is released and one engaged instead of requiring two to release and two others to engage as in another well known four speed design.

These and other objects will become apparent as the following drawings are viewed with respect to the accompanying specifications.

Figs. 1 to 5 are diagrammatic partial sectional elevations of the gear unit only showing the path of power and the brakes and clutches which are engaged or released for each speed. The loaded or working parts are shown in full lines and the non-working parts in dotted lines. Figs. 1, 2, 3, 4 and 5 are for low, second, third, fourth and reverse speeds respectively.

Figure 6:
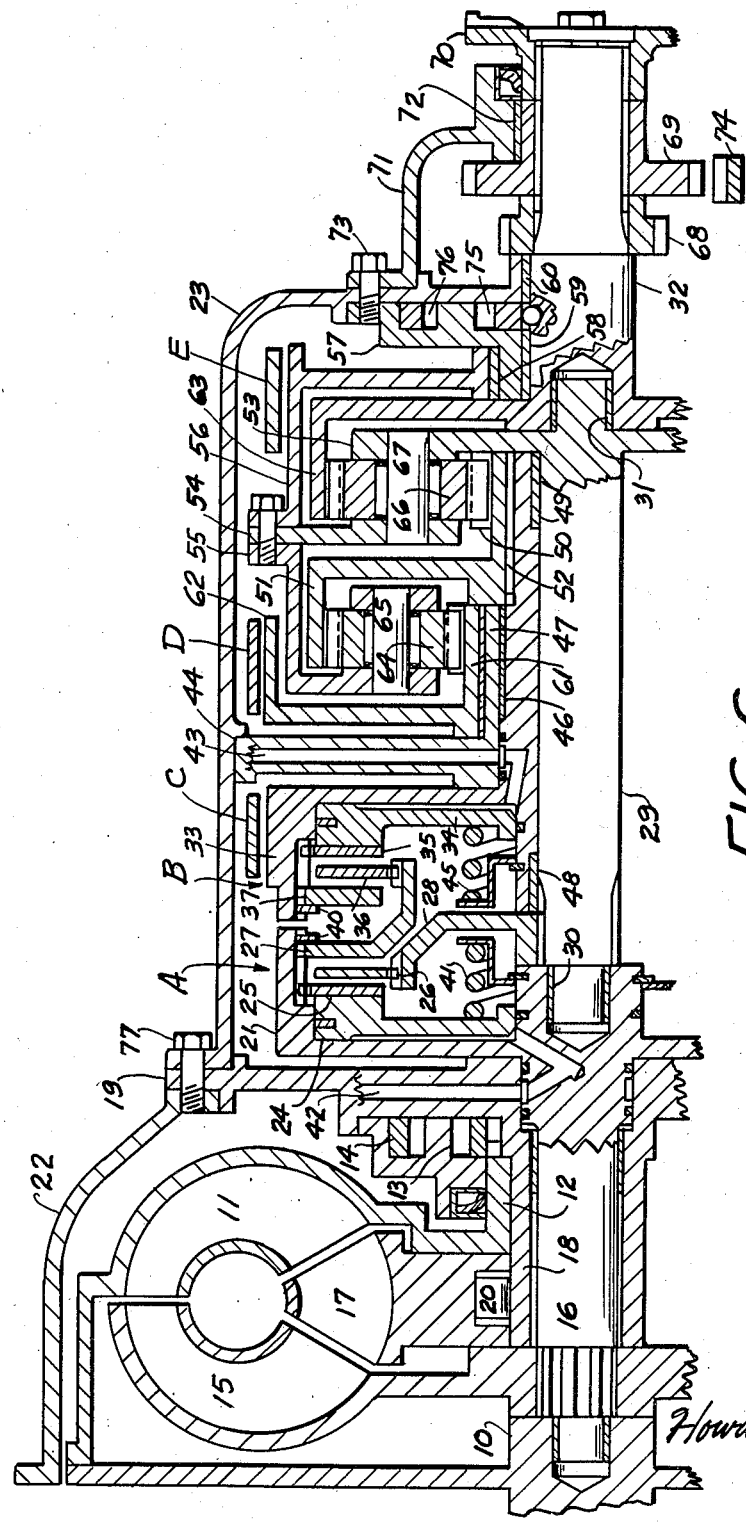

Fig. 6 is a simplified partial sectional elevation of the transmission in neutral, with brakes and clutches released. Various parts not needed to show the present embodiment, such as screws and washers, are omitted. Also the clutches show only two sliding plates instead of several as in the case of an actual transmission. Much of the hydraulic system is also omitted, as it is not a part of this invention, and those skilled in the art can readily adapt known hydraulic control means and valving to the novel rotating combination described.

In Fig. 6, engine shaft 10 drives converter pump 11, the hub 12 of which is keyed to pump gear 13 meshing with pump gear 14. Turbine 15 is driven by pump 11 and is splined to input shaft 16. Stator 17 is rotatably mounted on stationary hub 18 of housing plate 19 which is attached to converter housing 22 and gear housing 23 by screws 77.

One way brake 20 prevents backward rotation of stator 17 by locking it to hub 18 but permits forward rotation. Shaft 16 is integral with clutch A which consists of housing 21, piston 24, sliding plates 25 and 26 and pressure plate 27. Plate 25 is splined in housing 21 and plate 26 is splined to drum 28 which in turn is splined to shaft 29. Shaft 29 is piloted in bushing 30 in shaft 16 at the front end and in bushing 31 in output shaft 32 at the rear end.

Clutch B consists of housing 33, piston 34, sliding plates 35 and 36 and pressure plate 37. Plate 35 is splined to housing 33 and plate 36 is splined to pressure plate 27. Pressure plates 27 and 37 are held in place by snap rings 40. Retracting springs 41 and 45 return pistons to the positions shown unless overcome by oil pressure for clutch A which enters through opening 42 or for clutch B through opening 43 in housing plate 44. Clutch housing 33 is supported on bushing 46 in hub 47 of housing plate 44, and on shaft 29 at bushings 48 and 49. Clutch housing 33 drives integral sun gear 50 and ring gear 51 at splines 52. Carrier 53, integral with shaft 29, is connected with carrier flange 54, carrier 55 and brake drum 56, the latter being also supported on pump housing 57 at bushing 58.

Output shaft 32 is supported in pump housing 57 and gear housing 23 at bushings 59 and 60 respectively. Sun gear 61 is supported on hub 47 of housing plate 44 and has brake drum 62 integral. Output ring gear 63 is integral with output shaft 32. Three planets, one of which, 64, is shown mounted on pin 65 mesh with ring gear 51 and sun gear 61. Also three planets 66 mesh with ring gear 63 and sun gear 50, and one is shown in Fig. 6 mounted on pin 67. Flexible brake bands C, D and E, when contracted, hold clutch housing 33, which also acts as a brake drum, brake drum 62, and brake drum 56 respectively. Output shaft 32 has speedometer and governor gear 68, parking lock gear 69 and output flange 70 splined to it. Housing 71, held to gear housing 23 by screws 73 provides an outboard support at bushing 72 on the hub of parking lock gear 69. Detent 74 is engageable with parking lock gear 69. Pump gears 75 and 76 are driven by output shaft 32.

*Operation*

In low speed clutch B is engaged and brake D holds sun gear 61 as a reaction member as shown in Fig. 1. Ring gear 51 and sun gear 50 are input members and ring gear 63 is the output member with power flowing through the gears in two paths indicated by the arrows.

Figure 2:
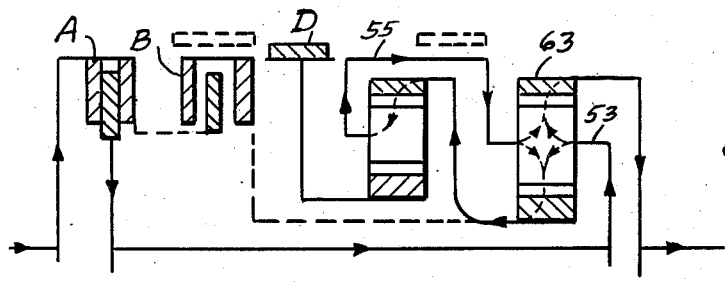

For second speed, shown in Fig. 2, clutch B is released and clutch A engaged with brake D remaining engaged. Input members are now carriers 53 and 55, with a split power path as shown by the arrows.

Figure 3:
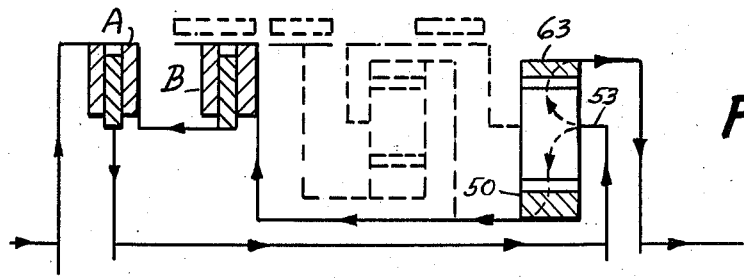

In third, shown in Fig. 3, both clutches A and B are engaged and all brakes released. Input from clutch A drives carrier 53 and the input from clutch B drives sun gear 50 and since both are turning at the same speed the transmission is then in direct drive.

Figure 4:
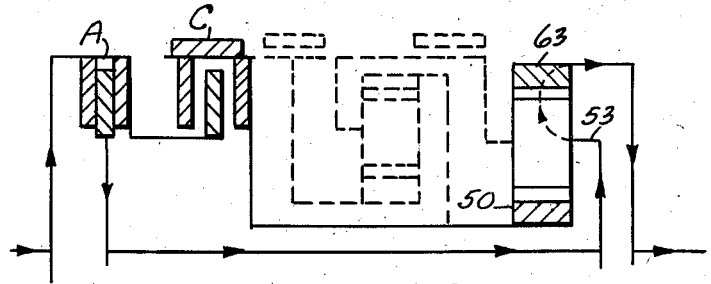

Fig. 4 shows fourth speed with clutch A driving carrier 53 and with sun gear 50 held by brake C thus overdriving ring 63.

Figure 5:
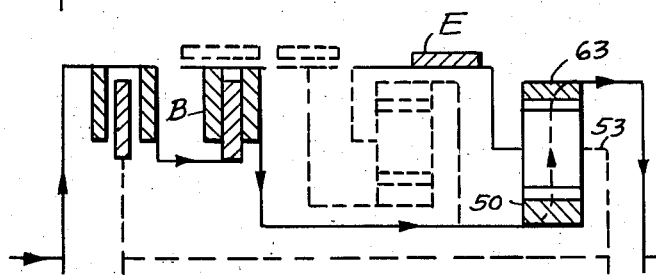

Fig. 5 shows reverse, with clutch B driving sun 50 and with carrier 53 held by brake E, thus turning ring 63 backward at reduced speed.

If R and S are the number of teeth in ring gear 63 and sun gear 50 respectively, and R' and S' are the number of teeth in ring gear 51 and sun gear 61 respectively, formulae for obtaining the speed of the output shaft 32 in relation to that of input shaft 16 are as follows—

Low $\left\{\dfrac{R'}{R'+S'} \times \dfrac{R+S}{R}\right\} \dfrac{S}{R}$

2nd $\dfrac{R+S}{R} - \left\{\dfrac{R'+S'}{R'} \times \dfrac{S}{R}\right\}$

3rd  Direct Drive

4th $\dfrac{R+S}{R}$

Reverse $\dfrac{S}{R}$

For instance, the speeds given below are obtained when the number of teeth are as follows—

R 76 teeth
R' 76 teeth
S 32 teeth
S' 44 teeth
Low .479
2nd .756
3rd 1.000
4th 1.421
Reverse .421

I do not limit my invention in its broader aspects to any particular combination or arrangement such as shown and described for illustrative purposes in the several embodiments herein, since various modifications will be apparent, to those skilled in the art, from the teachings of my invention within the scope thereof as defined in the appended claims.

I claim:

1. In a variable speed power transmission, an input shaft, an output shaft, first and second planetary gear sets, each set comprising sun gear, ring gear and carrier elements, the ring gear of the second set being connected to said output shaft, a first clutch for connecting the planet carriers of both sets to said input shaft, a second clutch for connecting the ring gear of the first set and the sun gear of the second set to the input shaft, a brake for holding the sun gear of the first set as a reaction member, whereby, when the brake is applied, the first clutch is engaged, and the second clutch is released, a reduction ratio drive between the input and output shafts is obtained and whereby, when the first clutch is released, the brake is applied, and the second clutch is engaged, a second reduction ratio drive between the input and output shafts is obtained.

2. The combination set forth in claim 1 and a brake for holding the sun gear of the second gear set whereby when the last mentioned brake is applied, the first clutch engaged and the second clutch and first mentioned brake are released, an overdrive ratio drive is established between the input and output shafts.

3. The combination set forth in claim 1 and a brake for holding the carrier of the second gear set as a reaction member whereby, when the last mentioned brake is applied, the second clutch is engaged and the first clutch and first mentioned brake are released, a reverse reduction drive ratio is established between the input and output shafts.

4. In a variable speed power transmission, an input shaft, an output shaft, first and second planetary gear sets, each set comprising sun gear, ring gear and planet carrier members, the ring gear of the second set being connected to the output shaft, a first clutch for connecting the planet carriers of both sets to the input shaft, a second clutch for connecting the ring gear of the first set and the sun gear of the second set to the input shaft, first, second and third brakes for engaging and holding respectively as reaction members the sun gear of the second gear set, the sun gear of the first gear set, and the planet carrier of the second gear set, said clutches and brakes being selectively engageable for obtaining four speeds forward and one reverse between the input and output shaft.

5. A variable speed power transmission comprising a housing, axially aligned power input and output shafts, first and second planetary gear sets interposed therebetween, each set having a sun gear, a ring gear, planet gears and a planet carrier, the ring gear of the second set being connected to the output shaft, the ring gear of the first set being connected with the sun gear of the second set, the planet carriers of both gear sets being connected together, means for effecting a plurality of drive ratios between said input and output members including selectively engageable brakes and clutches adapted, upon successive operation, to provide a first forward reduction ratio wherein said connected ring and sun gears are clutched to the input shaft, and the sun gear of the first gear set is held stationary; a second forward reduction wherein said connected planet carriers are clutched to the input shaft, and the sun gear of the first gear set is held stationary; a direct drive wherein both of said clutches are engaged; a fourth forward speed wherein said connected planet carriers are clutched to the input shaft, and the sun gear of the second gear set is held stationary; and a reverse speed reduction wherein said connected ring and sun gears are clutches to the input shaft, and the carrier of the second gear set is held stationary.

6. In a variable speed power transmission, input and output shafts, first and second planetary gear sets each comprising sun, ring and planet gears and a planet carrier, the second set ring gear being connected to the output shaft, a first clutch for coupling the planet carriers of the gear sets to the input shaft, a brake for holding said planet carriers against rotation, a second clutch for coupling the first set ring gear and the second set sun gear to said input shaft, a brake for holding said first set ring gear and second set sun gear against rotation, a third brake for holding the first set sun gear against rotation, whereby selective engagement of said clutches and brakes provides four forward speed ratios and one reverse speed ratio between said input and output shafts, one each of said clutches and brakes being engaged in reverse and in three of said forward speeds and both of said clutches and none of said brakes being engaged in the fourth forward speed.

7. The combination set forth in claim 6 in which the four forward speed ratios consist of two reduction speeds, a direct drive and an overdrive.

8. In a power transmission, an input shaft, an output shaft, a pair of planetary gear sets, each set having three coaxial rotatable elements comprising a ring gear, a sun gear, and a carrier, said carrier having planet pinions each meshing with said sun and ring gears, connecting means between a gear of each set, connecting means between the carriers, connecting means between the other gear of one set and the output shaft, means for holding the other gear of the other set against rotation to provide a torque reaction, means for establishing a first speed reduction through said transmission comprising means for establishing a substantially direct drive from said input shaft to said first mentioned gear of each set, and means for establishing a second speed reduction through said transmission comprising means for establishing a substantially direct drive from said input shaft to said carriers.

9. In a power transmission, an input shaft, an output shaft, a pair of planetary gear sets, each set having three coaxial rotatable elements comprising a ring gear, a sun gear, and a carrier, said carrier having planet pinions each meshing with said sun and ring gears, connecting means between a gear of each set, connecting means between the carriers, connecting means between the other gear of one set and the output shaft, means for holding the other gear of the other set against rotation to provide a torque reaction, means for establishing a first speed reduction through said transmission comprising clutch means for establishing a substantially direct drive from said input shaft to said gear of each set, and means for establishing a second speed reduction through said transmission comprising clutch means for establishing a substantially direct drive from said input shaft to said carriers.

10. In a power transmission, an input shaft an output shaft, first and second planetary gear sets, each set having three coaxial rotatable elements comprising a ring gear, a sun gear, and a carrier, said carrier having planet pinions each meshing with said sun and ring gears, connecting means between the ring gear of the first set and the sun gear of the second set, connecting means between the carriers, connecting means between the ring gear of the second set and the output shaft, brake means for holding the sun gear of the first set against rotation to provide a torque reaction, means for establishing a first speed reduction through said transmission comprising selectively engageable clutch means for establishing a substantially direct drive from said input shaft to said first set ring gear and second set sun gear, and means for establishing a second speed reduction through said transmission comprising second selectively engageable clutch means for establishing a substantially direct drive from said input shaft to said carriers.

11. In a power transmission, an input shaft, an output shaft, first and second planetary gear sets, each set having three coaxial rotatable elements comprising a ring gear, a sun gear, and a carrier, said carrier having planet pinions each meshing with said sun and ring gears, connecting means between the ring gear of the first set and sun gear of the second set, connecting means between the carriers, connecting means between the ring gear of the second set and the output shaft, first selectively engageable brake means for holding the sun gear of the first set against rotation to provide a torque reaction, means for establishing a first speed reduction through said transmission comprising first clutch means for establishing a substantially direct drive from said input shaft to said first set ring gear and second set sun gear while said first brake means is engaged, means for establishing a second speed reduction through said transmission comprising second clutch means for establishing a substantially direct drive from said input shaft to said carriers while said first brake means is engaged, and means for establishing an overdrive through said transmission comprising second brake means for holding the sun gear of said second set when said second clutch means is engaged and said first clutch means and first brake means are released.

12. In a power transmission, an input shaft, an output shaft, first and second planetary gear sets, each set having three coaxial rotatable elements comprising a ring gear, a sun gear, and a carrier, said carrier having planet pinions each meshing with said sun gear and ring gear, connecting means between the first set ring gear and second set sun gear, connecting means between the carriers, connecting means between the second set ring gear and the output shaft, brake means for holding the first set sun gear against rotation to provide a torque reaction, means for establishing a first speed reduction through said transmission, comprising first clutch means for establishing a substantially direct drive from said input shaft to said first set ring gear and second set sun gear, means for establishing a second speed reduction through said transmission comprising second clutch means for establishing a substantially direct drive from said input shaft to said carriers, and means for establishing a direct drive through said transmission comprising the simultaneous engagement of said first and second clutch means.

13. In a power transmission, an input shaft, an output shaft, first and secondary planetary gear sets, each set having three coaxial rotatable elements comprising a ring gear, a sun gear, and a carrier, said carrier having planet pinions each meshing with said sun and ring gears, connecting means between the first set ring gear and the second set sun gear, connecting means between the carriers, connecting means between the second set ring gear and the output shaft, first brake means for holding the first set sun gear against rotation to provide a torque reaction, means for establishing a first speed reduction through said transmission comprising first clutch means for establishing a substantially direct drive from said input shaft to said first set ring gear and second set sun gear, means for establishing a second speed reduction through said transmission comprising second clutch means for establishing a substantially direct drive from said input shaft to said carriers, and means for establishing a reverse speed reduction through said transmission comprising second brake means for holding said second set carrier while said second clutch means is engaged and said first clutch means and first brake means are released.

14. In a power transmission, an input shaft, an output shaft, first and second planetary gear sets, each set having three coaxial rotatable elements comprising a ring gear, a sun gear, and a carrier, said carrier having planet pinions each meshing with said sun and ring gears, connecting means between the first set ring gear and the second set sun gear, connecting means between the carriers, connecting means between the second set ring gear and the output shaft, means for establishing a first speed reduction through said transmission comprising first brake means for the first set sun gear and the clutch means between the input shaft and the first set ring gear and the second set sun gear, means for establishing a second speed reduction through said transmission comprising second clutch means between said input shaft and said carriers operable when said first clutch means is released and said first brake means is engaged, means for establishing a direct drive through said transmission comprising simultaneous engagement of said first and second clutch means while said first brake means is released, means for establishing an overdrive through said transmission comprising second brake means for said second set sun gear operable when said second clutch means is engaged and said first clutch and first brake means are released, and means for establishing a reverse reduction through said transmission comprising third brake means for said second set carrier operable when said first clutch means is engaged and said second clutch means and first and second brake means are released.

15. In a power transmission, an input shaft, an output shaft, first and second planetary gear sets, each set having three coaxial rotatable elements comprising a ring gear, a sun gear, and a carrier, said carrier having planet pinions each meshing with said sun and ring gears, connecting means between the first set ring gear and the second set sun gear, connecting means between the carriers, connecting means between the second set ring gear and output shaft, means for establishing a first speed reduction through said transmission comprising first brake means for said first set sun gear and clutch means between said input shaft and first set ring gear and second set sun gear, means for establishing a second speed reduction through said transmission comprising second clutch means between said input shaft and said carriers operable when said first clutch means is released and said first brake means is engaged, means for establishing a third speed direct drive through said transmission comprising simultaneous engagement of said first and second clutch means with said first brake means released, and means for establishing a reverse reduction through said transmission comprising second brake means for said second set carrier operable when said first clutch means is engaged and said second clutch means and first brake means are released.

References Cited in the file of this patent

UNITED STATES PATENTS

| | | |
|---|---|---|
| 1,870,076 | Thomson | Aug. 2, 1932 |
| 2,590,280 | Swift | Mar. 25, 1952 |
| 2,605,652 | Kelbel | Aug. 5, 1952 |
| 2,621,546 | Cliff | Dec. 16, 1952 |
| 2,623,412 | Hobbs et al. | Dec. 30, 1952 |
| 2,701,480 | Seybold | Feb. 8, 1955 |

UNITED STATES PATENT OFFICE
Certificate of Correction

Patent No. 2,826,936                                      March 18, 1958

Howard W. Simpson

It is hereby certified that error appears in the printed specification of the above numbered patent requiring correction and that the said Letters Patent should read as corrected below.

Column 3, lines 42 and 43, should appear as shown below instead of as in the patent:

$$\text{Low}\left\{\frac{R'}{R'+S'}\times\frac{R+S}{R}\right\}-\frac{S}{R}$$

Signed and sealed this 10th day of June 1958.

[SEAL]

Attest:
KARL H. AXLINE,
*Attesting Officer.*

ROBERT C. WATSON,
*Commissioner of Patents.*